April 29, 1941.　　　W. F. HEITSCHMIDT　　　2,239,783
MASKING DEVICE FOR CAMERAS
Filed Dec. 3, 1938
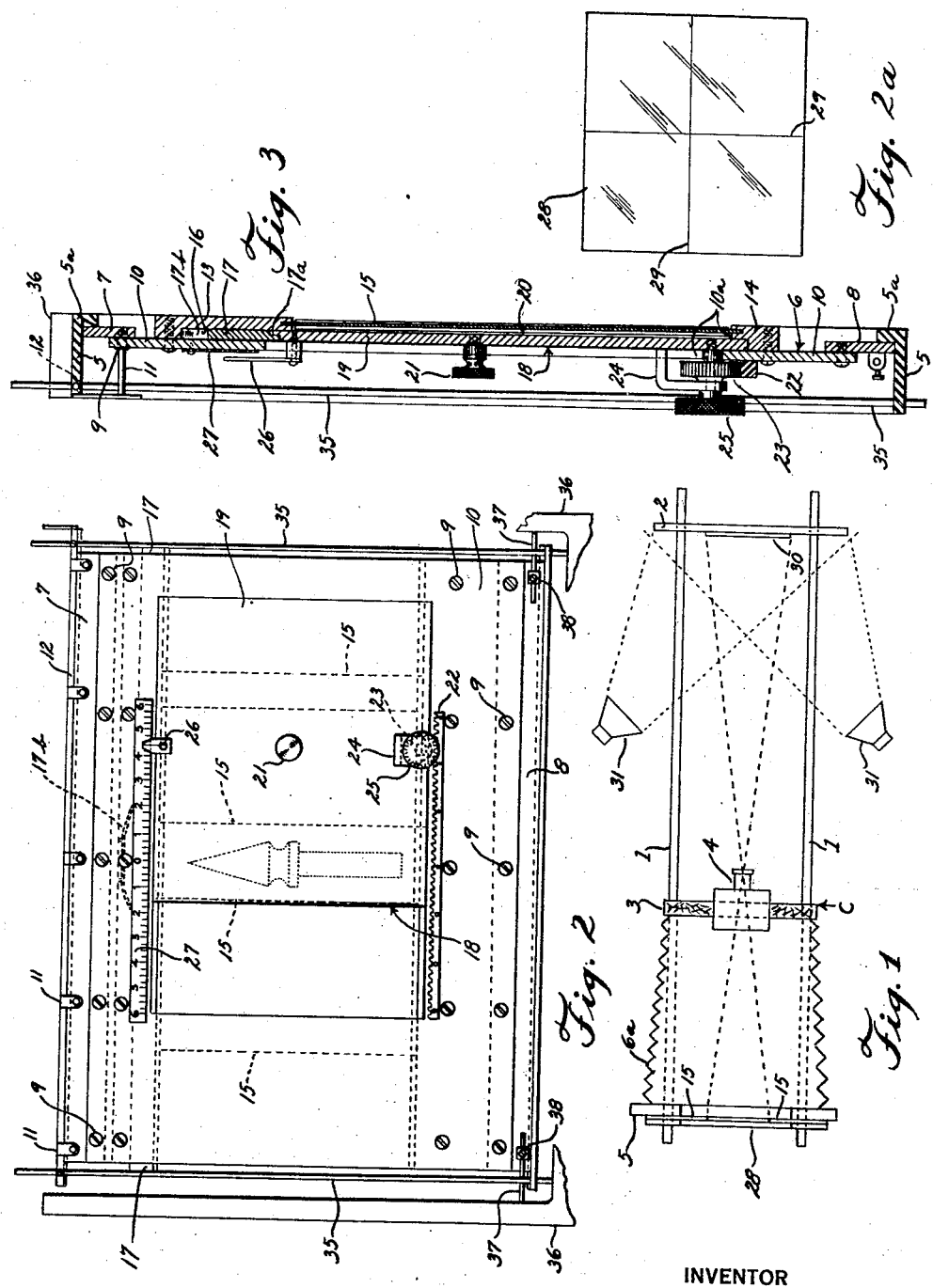
INVENTOR
WILLIAM F. HEITSCHMIDT
BY
Ward, Crosby & Neal
ATTORNEYS Patented Apr. 29, 1941

2,239,783

UNITED STATES PATENT OFFICE 2,239,783

MASKING DEVICE FOR CAMERAS

William F. Heitschmidt, Chicago, Ill., assignor to General Printing Ink Corporation, New York, N. Y., a corporation of Delaware Application December 3, 1938, Serial No. 243,711

5 Claims. (Cl. 88—24)

My invention relates to a masking device utilizable particularly on cameras.

In accordance with my invention, I provide a masking device which is simple in character and readily operable for obtaining a desired spaced arrangement of a plurality of latent images on a sensitized surface.

Various other objects, advantages and features of my invention will become apparent from the following detailed description.

My invention resides in the masking device, features and combinations and character hereinafter described and claimed.

For an understanding of my invention and for an illustration of one of the forms thereof, reference is to be had to the accompanying drawing, in which:

Figure 1 is a plan view diagrammatically illustrating a camera with which the masking device of my invention may be associated;

Fig. 2 is an elevational view showing the masking device of my invention associated with the frame for the sensitized surface;

Fig. 2a is an elevational view showing a translucent plate; and

Fig. 3 is an enlarged, transverse vertical sectional view of the arrangement shown in Fig. 2.

Referring to Fig. 1, C represents a camera of any suitable character which, as generally shown, may comprise guide tracks 1, 1 having slidably associated therewith a copy board 2, a holder 3 for an objective lens 4, and a frame 5, the holder 3 and frame 5 being connected together by suitable light-excluding means such as the bellows 6a. The frame 5 exemplifies any camera frame which is adapted to have a sensitized surface associated therewith. This frame 5 may be of the fixed type although, if desired, it may have associated therewith means for effecting vertical and horizontal movement thereof.

The frame 5 is adapted to have associated therewith in suitable detachable manner a frame 6 utilizable in accordance with the invention. This frame 6 may be constructed in a variety of ways and, as herein shown, it comprises upper and lower members 7 and 8 suitably secured, as by screws 9, to a plate 10 providing a central aperture 10a. This frame assembly comprising the members 7, 8 and 10 may be detachably associated with the frame 5 in any suitable manner. Thus, for example, the members 7, 8 may seat in upper and lower corners formed by the respective upper and lower ledges 5a of the frame 5 and, for detachably retaining the frame assembly in the position shown in Fig. 3, there may be utilized a plurality of latch members 11 all mounted on an oscillatory bar 12, the latch members 11, therefore, being readily movable in a clockwise direction, Fig. 3.

Secured in suitable manner to the rear face of the plate 10 are the upper and lower members 13 and 14 which are slotted to provide upper and lower horizontal tracks in which are freely slidable a pair of plates 15, 15 formed from suitable sheet-like material impervious to light rays.

Freely mounted in a horizontal passage 16 formed by surfaces of the plate 10 and member 13 is a latching bar 17 provided with a downwardly depending lip 17a, the bar 17 being biased downwardly by a suitable spring 17b confined in the passage 16. The passage 16 is of height sufficient to afford limited movement of the bar 17 in a vertical direction while maintained substantially horizontally. Accordingly, the ends of the bar 17 as shown in Fig. 2 may be engaged by hand and said bar elevated whereupon the lower edge of a sensitized carrier 18 may be seated in the corner defined by the member 14 and the surface of the plate 10 defining the lower boundary of the aperture 10a, Fig. 3. Thereupon, the bar 17 may be lowered to cause its lip 17a to engage the outer, upper surface of said sensitized carrier 18 and, in so doing, the latter is detachably locked in its operative position.

The aforesaid sensitized carrier 18 is shown as comprising a backing plate 19 which, on its front face, carries the sensitized member 20, the backing plate 19 preferably carrying a handle knob 21. Secured horizontally to the front face of the plate 19 is a rack member 22 with which engages a pinion 23 carrying a shaft journaled in a bracket arm 24 supported by the backing plate 19, the end of the pinion shaft carrying an operating wheel 25. Secured to the upper exterior surface of the backing plate 19 is a pointer 26 which coacts with a scale formed on a member 27 horizontally secured to the plate 19.

When the masking device of my invention is to be used, the frame 6 is associated with the frame 5 in the manner hereinbefore described. At this time, the space occupied by the sensitized carrier 18 is vacant and, therefore, a ground glass or other translucent plate 28, Fig. 2a, having vertical and horizontal registration lines 29, if desired, may be seated in the space shown in Fig. 3 as occupied by the sensitized carrier 18, said plate 28 being detachably retained in this position by the latching bar 17. Then, as indicated in Fig. 1, the object 30 to be photographed is suitably secured to the copy board 2 and illuminated by the light sources 31. Thereupon, by adjustment of the objective lens 4, an image of the object 30 is focussed on the plate 28 whereupon the plates 15, 15 are manually adjusted so as to take and retain the respective positions shown in Fig. 1 and, when thus positioned, said plates 15, 15 are separated so as to form a gap corresponding in width with that of the projecting light beam.

At this stage, the operator removes the plate 28 from the frame 6 and substitutes therefor a sensitized carrier 18, the pinion 23 of which comes into meshing relation with the rack member 22. Then, by manipulation of the wheel 25, said carrier 18 is adjusted so that the surface of the sensitized member 20 which is to receive the first latent image is positioned opposite the aforesaid gap defined by the plates 15, 15. The lamps 31 are energized at this time to effect the first exposure. Thereupon, said lamps 31 are extinguished and, by rotation of the wheel 25, the carrier 18 is moved toward the left, Fig. 2, until the surface of the sensitized member 20 which is to receive the second latent image is opposite the gap defined by said plates 15, 15 whereupon the projection operation is repeated. In this manner, the carrier 18 is moved step-by-step to bring selected sections of the sensitized member 20 opposite the gap formed by the plates 15, 15 whereby a plurality of latent images are formed on said sensitized member 20, the spacing of these images usually being determined by observation of the pointer 26 and its cooperative scale.

In view of the foregoing, it follows that the masking arrangement of my invention affords a convenient and simple way by which an operator may obtain a desired spaced relation of a plurality of latent images on a sensitized member or other light-sensitive surface. The masking plates 15, 15 are readily operable for the intended purpose and such frictional engagement as they have with the respective trackways serves to prevent casual unintended movement thereof.

It shall be understood that my invention is not to be limited to the precise structural arrangement herein shown. Thus, I have shown the frame 6 as having rods 35 secured to the respective opposite sides thereof, these rods 35 being adapted to seat upon adjacent respective surfaces of the camera framework 36 and prevent vertical movement of the frame 6. Similarly, I have shown the lower part of said frame 6 as having associated therewith rods 37 adjustably mounted in blocks 38, these rods 37 being adapted to engage opposite, respective surfaces of said framework 36 so as to prevent horizontal movement of the frame 6. These rods 35, 37 are not essential and, when some positioning means is required, it shall be understood that other equivalent arrangements may be substituted therefor. Likewise, it shall be understood that other equivalent latching arrangements may be utilized in lieu of the latching bar 17. The same holds true with respect to the various other detailed mechanical arrangements herein shown.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a masking device of the character described, a frame having an aperture to be traversed by a projecting light beam, said frame comprising a seat adapted to support a sensitized carrier, means carried by said frame for detachably retaining the sensitized carrier on said seat in alinement with said aperture, means for moving said sensitized carrier with respect to said aperture, and a pair of sheet-like plates slidably associated with said frame, said plates being adjustable toward or from each other and with respect to said aperture.

2. In a masking device of the character described, a frame having an aperture to be traversed by a projecting light beam, said frame comprising a seat adapted to support a sensitized carrier, means carried by said frame for detachably retaining the sensitized carrier on said seat in alinement with said aperture, means for moving said sensitized carrier with respect to said aperture, said last named means comprising a rack bar carried by said frame and a pinion carried by said sensitized carrier, and a pair of sheet-like plates slidably associated with said frame, said plates being adjustable toward or from each other and with respect to said aperture.

3. In a masking device of the character described, a frame having an aperture to be traversed by a projecting light beam, said frame comprising a seat adapted to support either a sensitized carrier or a translucent plate, means carried by said frame for detachably retaining either said sensitized carrier or said translucent plate on said seat in alinement with said aperture, and a pair of sheet-like plates slidably associated with said frame, said plates being adjustable toward or from each other and with respect to said aperture.

4. In a masking device of the character described, a frame having an aperture to be traversed by a projecting light beam, said frame comprising a seat adapted to support a sensitized carrier, means carried by said frame for detachably retaining the sensitized carrier on said seat in alinement with said aperture, upper and lower tracks horizontally formed in said frame, and a pair of sheet-like plates slidable in said tracks.

5. In a masking device of the character described, a frame having an aperture to be traversed by a projecting light beam, said frame comprising a seat adapted to support a sensitized carrier, means carried by said frame for detachably retaining the sensitized carrier on said seat in alinement with said aperture, a rack horizontally positioned on said frame, a pinion coactable with said rack, means for journalling said pinion on said sensitized carrier, upper and lower tracks horizontally formed in said frame, and a pair of sheet-like plates slidable in said tracks.

WILLIAM F. HEITSCHMIDT.